Patented July 28, 1936

2,049,087

UNITED STATES PATENT OFFICE 2,049,087

TREATMENT OF CELLULOSE DERIVATIVES

Robert L. Sibley, Nitro, W. Va., assignor, by mesne assignments, to Monsanto Chemical Company, Wilmington, Del., a corporation of Delaware No Drawing. Application September 26, 1932,
Serial No. 634,930

21 Claims. (Cl. 8—5)

The present invention relates to the dyeing, printing or stencilling of artificial yarns, threads, filaments, fabrics, films or other products made of or containing cellulose acetate.

According to the present invention it has been found that particularly useful and desirable results may be obtained by the employment of a solubilizing agent or agents consisting of or comprising a sulphonated reaction product of an alcohol and a hydroxy substituted diphenyl, that is to say a body which is capable of being obtained by the treatment of a reaction product of an alcohol, for example an aliphatic alcohol, and a hydroxy substituted diphenyl with sulphuric acid or a salt of such body, for example, an alkali or ammonium salt.

Accordingly the present invention comprises the dyeing, printing or stencilling of cellulose acetate or goods containing the same with any insoluble or relatively insoluble coloring matters or organic compounds having affinity for cellulose acetate or capable of coloring the same, in the form of soluble or more soluble modifications prepared by treatment with a solubilizing agent comprising a sulphuric acid derivative of a reaction product of an alcohol and a hydroxy substituted diphenyl, or salts of such bodies, for example an alkali or ammonium salt thereof.

The dye baths for applying the coloring matters or compounds solubilized according to the present invention may be acid, neutral or alkaline.

Any insoluble or relatively insoluble coloring matter or compound having affinity for cellulose acetate may be employed. Usually, however, the coloring matters or coloring compounds for use according to the present invention will contain no strongly acidic group such as the sulpho group, and when basic coloring matters or compounds are employed, they are preferably used in the form of the base and not in the form of salts as the hydrochloride.

The solubilization may be effected by mixing or grinding the insoluble or relatively insoluble coloring matters or compounds with one or more of the solubilizing agents of the present invention in the presence or absence of water, and heating if necessary, the solubilized modifications being filtered, if required, before addition to the dye baths or other preparations for dyeing or otherwise coloring the goods. The dyeing, printing or stencilling may be effected in the usual manner.

Other coloring matters which are not deleteriously affected by the solubilizing agents of the present invention may, if desired, be dyed on the present material together with the coloring matters or compounds treated according to the present invention.

Mixed goods may be dyed or otherwise colored in uniform or contrasting effects with or without the employment of other dyestuffs according to the character of the nonacetate portion of the goods, said other dyestuffs being applied before, after, or, if not harmfully affected thereby, together with the insoluble dyestuffs or compounds treated according to the present invention.

The solubilizing agents of the present invention may be prepared in any known or suitable way. The following example illustrates one method of preparing the preferred class of compounds.

Example A 907 grams of a mixture of substantially 85% of ortho hydroxy diphenyl and 15% of para hydroxy diphenyl and 800 grams of normal butyl alcohol (the quantities of the hydroxy diphenyl and butyl alcohol employed above are in the ratio of substantially one molecular proportion of hydroxy diphenyl to a slight excess over two molecular proportions of butyl alcohol) were placed in a suitable reactor equipped with a reflux condenser and heated at refluxing temperature for substantially two hours. The reaction product so produced was then allowed to cool to substantially 75° C. after which 4000 grams of 93% sulphuric acid was added thereto, at a temperature of substantially 75 to 85° C. After the addition of the sulphuric acid was completed, the resulting product was heated for a period of substantially four hours at a temperature of substantially 80 to 85° C. The product thus obtained was in the form of two layers, the upper layer of which was drawn off and diluted with water to a volume having a total weight of substantially 6000 grams. The charge was then heated to 90 to 95° C. and treated with sufficient freshly slaked lime to convert the free sulphuric acid present to calcium sulphate and to convert the sulphuric acid derivative of the reaction product of normal butyl alcohol and hydroxy substituted diphenyl to the calcium salt thereof. After filtering off the calcium sulphate formed by the liming treatment described, sufficient sodium carbonate, preferably as a concentrated aqueous solution thereof, was added to the filtrate to convert the calcium salt of the above described reaction product to the corresponding sodium salt. The calcium carbonate thereby precipitated was filtered off and the filtrate comprising an aqueous solution of one of the preferred materials, which may be called the sodium salt of the sulfonated normal butylated ortho-para hydroxy-diphenyl, may, if desirable, be employed in its present aqueous condition when carrying out the solubilizing process according to the present invention, or if preferred the aqueous solution thereof may be partially concentrated or completely dried and employed in the form of a solid.

Other sulphuric acid derivatives, as well as the alkali salts thereof, of the reaction products of an alcohol and a hydroxy substituted diphenyl than that set forth in Example A have been prepared and the reaction products so obtained likewise may be employed in the manner hereinbefore set forth. Thus, the sodium salts of the following materials as well as others have been prepared and their use, as well as the use of their chemical equivalents, in the manner hereinbefore set forth, falls within the scope of the present invention.

1. The sulfuric acid derivative of the reaction product of iso-butyl alcohol and a mixture of substantially 85% ortho and substantially 15% para hydroxy substituted diphenyl.

2. The sulfuric acid derivative of the reaction product of iso-propyl alcohol and a mixture of substantially 85% ortho and substantially 15% para hydroxy substituted diphenyl.

3. The sulfuric acid derivative of the reaction product of normal amyl alcohol and a mixture of substantially 85% ortho and substantially 15% para hydroxy substituted diphenyl.

4. The sulphuric acid derivative of the reaction product of normal octyl alcohol and a mixture of substantially 85% ortho and substantially 15% para hydroxy substituted diphenyl.

5. The sulphuric acid derivative of the reaction product of benzyl alcohol and a mixture of substantially 85% ortho and substantially 15% para hydroxy substituted diphenyl.

6. The sulphuric acid derivative of the reaction product of normal butyl alcohol and para hydroxy substituted diphenyl.

7. The sulphuric acid derivative of the reaction product of normal butyl alcohol and ortho hydroxy substituted diphenyl.

8. The sulphuric acid derivative of the reaction product of cyclohexanol and a mixture of substantially 85% ortho and substantially 15% para hydroxy substituted diphenyl.

The term dyeing in the appended claims is intended to include printing and stencilling, while the term "relatively water-insoluble organic compounds capable of coloring cellulose acetate" is to be understood as including any insoluble or relatively insoluble coloring matter or organic compound having affinity for cellulose acetate or capable of coloring the same or any component (base or developer) capable of application by the azoioc or development process.

What is claimed is:

1. Process for dyeing materials comprising cellulose acetate, comprising applying thereto aqueous dispersions of relatively water-insoluble organic compounds capable of coloring cellulose acetate prepared by pre-treating the compounds with a solubilizing agent comprising a compound selected from the group consisting of the sulphonated reaction product of an alcohol and a hydroxy substituted diphenyl and their soluble salts.

2. Process for dyeing materials comprising cellulose acetate, comprising applying thereto aqueous dispersions of relatively water-insoluble organic compounds capable of coloring cellulose acetate prepared by pre-treating the compounds with a solubilizing agent comprising a soluble salt of the sulphonated reaction product of an alcohol and a hydroxy substituted diphenyl.

3. Process for dyeing materials comprising cellulose acetate, comprising applying thereto aqueous dispersions of relatively water-insoluble organic compounds capable of coloring cellulose acetate prepared by pre-treating the compounds with a solubilizing agent comprising a soluble salt of the sulphonated reaction product of an aliphatic alcohol and a hydroxy substituted diphenyl.

4. Process for dyeing materials comprising cellulose acetate, comprising applying thereto aqueous dispersions of relatively water-insoluble organic compounds capable of coloring cellulose acetate prepared by pre-treating the compounds with a solubilizing agent comprising a soluble salt of the sulphonated reaction product of an aliphatic alcohol and an ortho hydroxy substituted diphenyl.

5. Process for dyeing materials comprising cellulose acetate, comprising applying thereto aqueous dispersions of relatively water-insoluble organic compounds capable of coloring cellulose acetate prepared by pre-treating the compounds with a solubilizing agent comprising a soluble salt of the sulphonated reaction product of normal butyl alcohol and an ortho hydroxy substituted diphenyl.

6. Process for dyeing materials comprising cellulose acetate, comprising applying thereto aqueous dispersions of relatively water-insoluble organic compounds capable of coloring cellulose acetate prepared by pre-treating the compounds with a solubilizing agent comprising a sodium salt of a sulphonated reaction product of normal butyl alcohol and an ortho hydroxy substituted diphenyl.

7. Process for dyeing materials comprising cellulose acetate, comprising applying thereto aqueous dispersions of relatively water-insoluble organic compounds capable of coloring cellulose acetate prepared by pre-treating the compounds with a solubilizing agent comprising a sodium salt of a sulphonated reaction product of normal butyl alcohol and a mixture of ortho and para hydroxy substituted diphenyl.

8. Process for dyeing materials comprising cellulose acetate, comprising applying thereto aqueous dispersions of relatively water-insoluble organic compounds capable of coloring cellulose acetate prepared by pre-treating the compounds with a solubilizing agent comprising a sodium salt of a sulphonated reaction product of normal butyl alcohol and a mixture of substantially 85% ortho and substantially 15% para hydroxy substituted diphenyl.

9. Dyeing preparations comprising relatively water-insoluble organic compounds pretreated with a solubilizing agent comprising a compound selected from the group consisting of the sulphonated reaction product of an alcohol and a hydroxy substituted diphenyl and their soluble salts.

10. Dyeing preparations comprising relatively water-insoluble organic compounds pretreated with a solubilizing agent comprising a soluble salt of the sulphonated reaction product of an alcohol and a hydroxy substituted diphenyl.

11. Dyeing preparations comprising relatively water-insoluble organic compounds pretreated with a solubilizing agent comprising a soluble salt of the sulphonated reaction product of an aliphatic alcohol and a hydroxy substituted diphenyl.

12. Dyeing preparations comprising relatively water-insoluble organic compounds pretreated with a solubilizing agent comprising a soluble salt of the sulphonated reaction product of an aliphatic alcohol and an ortho hydroxy substituted diphenyl.

13. Dyeing preparations comprising relatively water-insoluble organic compounds pretreated with a solubilizing agent comprising a soluble salt of the sulphonated reaction product of normal butyl alcohol and an ortho hydroxy substituted diphenyl.

14. Dyeing preparations comprising relatively water-insoluble organic compounds pretreated with a solubilizing agent comprising a sodium salt of a sulphonated reaction product of normal butyl alcohol and an ortho hydroxy substituted diphenyl.

15. Dyeing preparations comprising relatively water-insoluble organic compounds pretreated with a solubilizing agent comprising a sodium salt of a sulphonated reaction product of normal butyl alcohol and a mixture of ortho and para hydroxy substituted diphenyl.

16. Dyeing preparations comprising relatively water-insoluble organic compounds pretreated with a solubilizing agent comprising a sodium salt of a sulphonated reaction product of normal butyl alcohol and a mixture of substantially 85% ortho and substantially 15% para hydroxy substituted diphenyl.

17. Dyeing preparations comprising relatively water-insoluble organic compounds pretreated with a solubilizing agent comprising the sodium salt of a sulfonated butylated mixture of ortho and para hydroxy substituted diphenyl.

18. Process for dyeing cellulose acetate materials comprising applying thereto aqueous dispersions of relatively water-insoluble organic compounds capable of coloring cellulose acetate prepared by pretreating the compounds with a solubilizing agent comprising a compound selected from the group consisting in the sulfonated reaction product of an alcohol and a hydroxy substituted diphenyl, produced by treating said reaction product with concentrated sulfuric acid, and their soluble salts.

19. Process for dyeing cellulose acetate materials comprising applying thereto aqueous dispersions of relatively water-insoluble organic compounds capable of coloring cellulose acetate prepared by pretreating the compounds with a solubilizing agent comprising a compound selected from the group consisting in the sulfonated reaction product of an aliphatic alcohol and a hydroxy substituted diphenyl, produced by treating said reaction product with concentrated sulfuric acid, and their soluble salts.

20. Process for dyeing cellulose acetate materials comprising applying thereto aqueous dispersions of relatively water-insoluble organic compounds capable of coloring cellulose acetate prepared by pretreating the compounds with a solubilizing agent comprising a compound selected from the group consisting in the sulfonated reaction product of an aliphatic alcohol and an ortho hydroxy substituted diphenyl, produced by treating said reaction product with substantially 93% sulfuric acid, and their soluble salts.

21. Process for dyeing cellulose acetate materials comprising applying thereto aqueous dispersions of relatively water-insoluble organic compounds capable of coloring cellulose acetate prepared by pretreatment of the compounds with a solubilizing agent comprising an alkali metal salt of the sulfonated reaction product of butyl alcohol and a mixture of ortho and para hydroxy substituted diphenyl, said sulfonation being produced by treating said reaction product with substantially 93% sulfuric acid.

ROBERT L. SIBLEY.